United States Patent Office 3,284,371
Patented Nov. 8, 1966

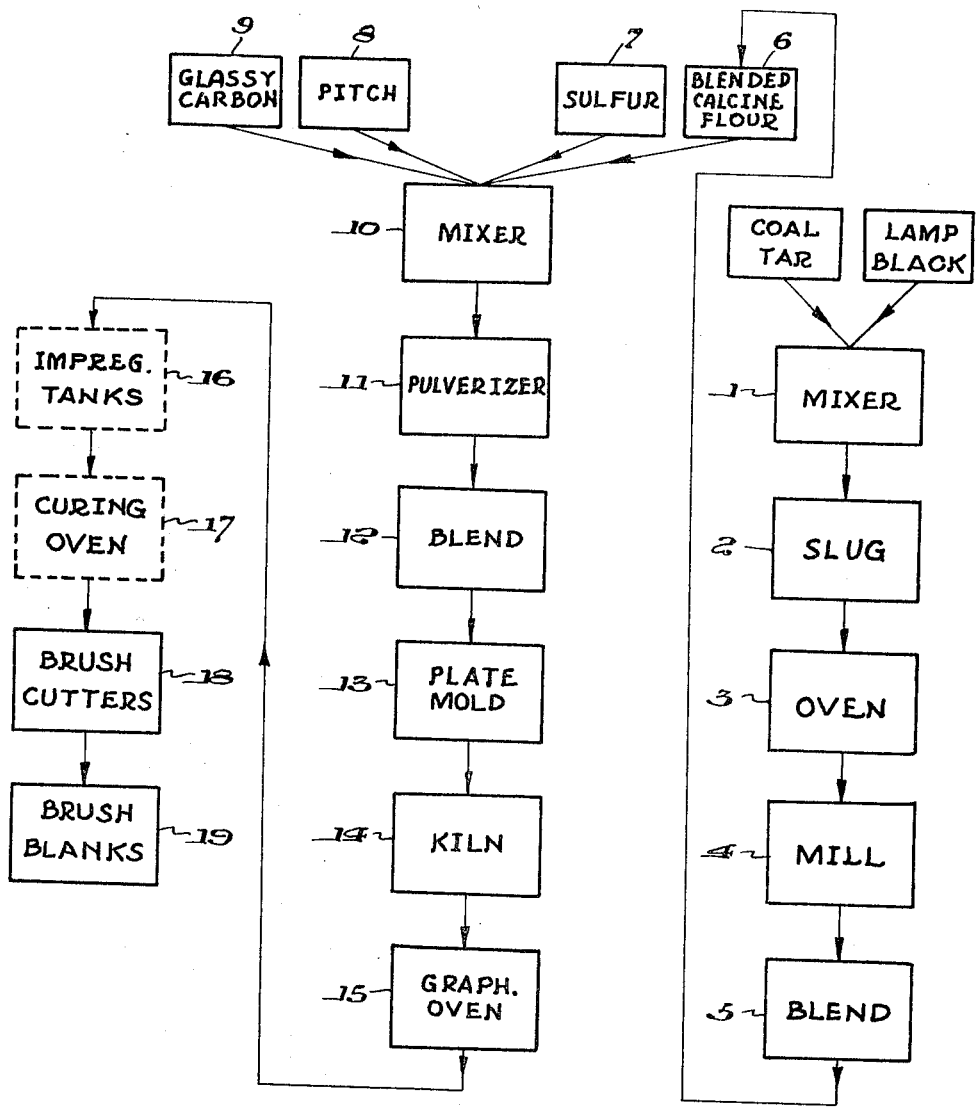

3,284,371
ELECTROGRAPHITIC BRUSH
Walter G. Krellner, St. Marys, Pa., assignor to Stackpole Carbon Company, St. Marys, Pa., a corporation of Pennsylvania
Filed Jan. 14, 1964, Ser. No. 337,640
1 Claim. (Cl. 252—502)

This invention relates to electrographitic, or dynamoelectric brushes, for use in sliding contact with metallic current collecting elements of dynamoelectric machines. The term "dynamoelectric" as used herein contemplates brushes such as the well-known carbon and electrographitic types and is so used herein. Such brushes comprise a body of electrically conductive carbonaceous material such, for example, as graphite, coke, or other forms of carbon, e.g. lamp black. The carbonaceous material in finely divided form is mixed with a carbonaceous temporary binder, such as tar, pitch or synthetic resin, and the mixture is molded to form plates or blocks that are subsequently heated to carbonize the binder and produce a residual carbon bond. In the case of electrographitic products the shapes after the carbonizing treatment are heated at a temperature sufficiently high to convert the carbonaceous material to graphite, for instance at temperatures above 2700° C. The nature, composition, and modes of producing such brushes are well-known in the trade.

Although electrographitic brushes have been made and used extensively for many years, further improvement in their performance would be desirable, especially with respect to their commutating ability and brush life.

It is among the objects of this invention to provide electrographitic brushes which possess improved commutating ability and exhibit longer life as compared with those presently available commercially, which can be made readily using existing equipment for making electrographitic brushes and without objectionable modification of existing production procedures.

The invention may be described with reference to the accompanying drawing which is a flow sheet representing, by way of illustration but not of limitation, the invention with reference to its preferred practice.

I have discovered, and it is upon this that the invention is predicated in large part, that its objects are attained by incorporating a small amount of finely divided glassy carbon in batches conventionally used for the production of electrographitic brushes.

Glassy carbon is a term applied to a form of carbon characterized by being black, shiny, extremely hard, exhibiting conchoidal fracture, and particles of which have sharp corners. It is completely non-porous for all practical purposes, resembling glass from this standpoint. For these reasons this material is sometimes termed "vitreous carbon" by some investigators.

Particular characteristics of this material are that it cannot be converted to graphite even at 3000° C., and that it is of turbostratic structure of very small crystallite size. Its hardness is about 100 to 120 on the Shore scale. Glassy carbon is characterized further by being remarkably resistant to attack by strong mineral acids, including hydrofluoric acid, and by a lower rate of oxidation in air or water vapor than other forms of carbon. The internal friction of glassy carbon is only about one-fourth that of other non-crystalline carbons. Its density distinguishes it also from other amorphous carbons; the bulk density and the real density are approximately 1.5 gm./cc., whereas other forms of amorphous carbon have a wide range of bulk densities usually between 1.0 to 1.8, with the real densities being from 1.7 to 2.0 and increasing to about 1.9 to 2.2 gm./cc. after heating to 3000° C.

Glassy carbon is described in various publications, for instance an article by T. Yamaguchi in the magazine Carbon, vol. I, pages 47–50 (1963), and in an article by T. Tsuzuku and H. Kobayashi beginning at page 539 of the Proceedings of the 5th Carbon Conference. It is described also in an article by Lewis, Redfern and Cowlard appearing in the publication, "Solid State Electronics," in vol. 6, at pages 251–254 (1963).

Glassy carbon is produced by carbonizing highly cross-linked macromolecular structures which in addition to carbon and hydrogen, contain oxygen, nitrogen or sulfur and which when carbonized form rigidly cross-linked aromatic planes which prevent further conversion to a graphitic structure. This form of carbon may be made by, for instance, carbonizing copolymers of furfural and phenolic resins such as are disclosed, for instance, in U.S. Patent 1,693,939.

Glassy carbon suited for the purposes of the invention has been made satisfactorily by mixing a mixture of, by weight, 150 parts of a phenol-formaldehyde resin and 200 parts of furfural.

The practice of the invention follows the procedure generally used in the making of electrographitic brushes of intimately mixing finely divided carbonaceous material, such as lamp black, with a carbonaceous binder, such as pitch or coal tar, shaping the batch and carbonizing it. As is known in the art, the practice varies according to the raw materials, the properties desired, etc.

In the practice of this invention glassy carbon in finely divided condition is added to batches used and processed conventionally as just indicated. For the purposes of the invention the glassy carbon is pulverized to pass a 100-mesh screen (Tyler), preferably with 50 percent or more passing 200-mesh. A sufficient amount of the glassy carbon is added to constitute about 0.5 to 10 percent by weight of the batch, with 2 percent generally giving highly desirable results.

The glassy carbon functions to increase the black band spread substantially, with concurrent extension of the brush life. The hardness and form of the particles are such that the glassy carbon in the brush might be expected to show considerable abrasive action on the commutator or ring but actual experience has shown that this action is minor in character with no excessive commutator or ring wear while on the other hand it results in an unexpected improvement in brush life.

The preferred practice of the invention will now be described with reference to the accompanying flow sheet. In describing this typical example amounts stated are in parts by weight.

Lamp black and coal tar in the proportions of 100 parts of the former to 150 parts of the latter are fed from storage bins to a mixer 1, suitable of paddle-type, to produce an intimater mixture of them. The coal tar may be heated to render the mixture plastic and to increase the ease and thoroughness of mixing. From mixer 1 the hot mix passes to a means 2, such as a mold, for forming it under pressure into blocks or plates which are then passed to an oven 3 which is gradually raised to a temperature of, for example, 1000° C. to carbonize, or calcine the mixture. The calcined blocks then pass to a mill 4, such as a roller mill, to reduce the calcined material so that about 80 percent will pass a 200-mesh screen. For quality control a number of batches of the calcined flour may be accumulated and blended in a blending apparatus 5 of any suitable type, and the blended calcine flour passes to a bin 6. 100 parts of the blended calcined flour are passed from bin 6 to a mixer 10 which receives also 5 parts of sulfur from a bin 7, 55 parts of pitch from a bin 8, and from 0.5 to 10 percent of powdered glassy carbon from a bin 9. When these ingredients have been intimately mixed they are passed to a mill 11 to pulverize the mixture so that about 60 percent is finer than 200-mesh.

For purposes of quality control a number of batches of this pulverized product may be passed to a blender 12, and the fully blended material then passes to a mold 13 where the material is formed into rectangular plates at, for instance, 120° C. under 800 p.s.i. pressure. The plates are then heated in a kiln 14 and heated to 1200° C. while packed in coke to protect them from oxidation by air. From the kiln 14 the plates pass to a graphitizing oven 15 where they are heated at from 2700° to 3000° C., thus forming plate stock which, if desired, may be treated in various ways to confer particular properties. Thus, they may be impregnated with various salts to condition them for use at high altitudes or under conditions of low humidity in accordance with U.S. Patents 2,656,475, 2,860,076, and 3,063,947, or with waxes or wax-like material to confer lubricating properties, for instance in accordance with Patent 2,819,989, or with phenolic or other synthetic resins, e.g., according to Patent 2,087,724 to confer increased mechanical strength and life upon the brush. Such impregnation, if used, may be accomplished by means well-known in the art, i.e., by enclosing the graphitized plates in a tank 16 and effecting the impregnation by the well-known technique of evacuating the tank, introducing the impregnant, and then applying pressure. From the tank 16 the impregnated plates pass to a curing oven 17, where necessary, to cure the impregnant, such as a synthetic resin. Finally, the graphitized blanks, whether or not impregnated, pass to brush cutters 18 where blanks 19 are cut to desired size.

As evidencing the benefits to be derived from the invention, brushes made as just described and containing in one case 2 percent of glassy carbon and in another case 10 percent of glassy carbon were tested in comparison with brushes of the same size made in the same way but without glassy carbon. The standard brush without glassy carbon had a black band commutation spread of 22 and a life of 7300 hours. In sharp contrast a brush in accordance with this invention containing 2 percent of glassy carbon had a black band spread of 37 and a life of 11,500 hours, while that with 10 percent of glassy carbon had a black band of 34 and a life of 10,000 hours. It is apparent that this use of glassy carbon in accordance with the invention resulted in over 50 percent increase in life and commutating ability.

These tests were conducted using a Westinghouse 25 kw., 125 volt, 200 ampere, 3600 r.p.m. exciter. This machine in common with most large D.C. machines is equipped with interpoles between the main fields to aid the brush to operate "black," i.e. without sparking. For test purposes an external D.C. supply is used to increase (boost) the current through the interpole windings or to decrease (buck) the current, which is sometimes referred to as buck-boost testing. The total amount or spread that the current can be increased and decreased from normal without having the brushes spark is a measure of the commutating ability of the brush being tested, and it is called its "black band."

The critical factor in the present invention is the use of glassy carbon. Apart from that the various factors involved in the composition and processing of electrographitic brush batches may vary considerably, as is well-known in the art. Pitch may be used with or instead of coal tar in forming the mixture in mixer 1, and other forms of carbon such as coke, charcoal or graphite may be used singly or in combination in that step, depending on the properties wished of the brushes. Although reference has been made to operation of oven 3 at 1000° C. (1630° F.) the temperature may range from 1400° to 2000° F., and the time of heating may vary from 1 to 2 weeks, depending upon the temperature, the make-up, and proportions of the mix, preferably the charge is treated slowly to polymerize the binder and carbonize it. Mill 4 may produce pulverized material from 50 to 90 percent through 200-mesh although 80 percent as described generally suffices. Sulfur as added from bin 7 may be dispensed with although its use is desirable because it reacts with pitch to cause polymerization of hydrocarbons and give material of higher coking value. The particles from pulverizer 11 may range from 40 to 90 percent through 200-mesh although 60 percent is preferred for any purposes. In operating the plate mold 13 the higher the amount of pitch the lower the temperature of the mix may be, while the applied pressure will depend upon the density desired, which may range from 1.3 to 1.6. Kiln 14 is suitably raised up to 1200° C. for, say, a month to insure complete carbonization. Suitably the graphitizing oven 15 is of continuous type so operated that the plates passing through it are at temperature for about 4 hours. If quality control is not important the blending operations 5 and 12 may be dispensed with. In the case of curing impregnated blanks the temperature may range from 200° to 500° F. and the time of exposure from 2 hours to 2 days depending upon the impregnant. Other variations from the practice described will of course be understood by those skilled in the art to be permissible, depending upon materials, conditions, and results desired.

According to the provisions of the patent statutes, I have explained the principle of my invention and have illustrated and described what I now consider to represent its best embodiment. However, I desire to have it understood that, within the scope of the appended claim, the invention may be practiced otherwise than as specifically illustrated and described.

I claim:

A electrographitic brush consisting essentially of a bonded body of graphite having from about 0.5 to 10 percent by weight of pulverized glassy carbon distributed through the body.

References Cited by the Examiner

UNITED STATES PATENTS

| 1,243,009 | 10/1917 | Thomsen | 252—510 |
| 2,310,108 | 2/1943 | Moberly | 252—502 |
| 3,109,712 | 11/1963 | Redfern | 23—209.2 |

OTHER REFERENCES

Yamaguchi, Carbon, vol. I, pages 47–50 (1963).

SAMUEL H. BLECH, *Primary Examiner.*

JULIUS GREENWALD, *Examiner.*

J. D. WELSH, *Assistant Examiner.*